United States Patent Office 2,724,730
Patented Nov. 22, 1955

2,724,730

CONDENSATION OF HEXACHLOROCYCLOPENTADIENE

Arnold N. Johnson, Niagara Falls, N. Y., assignor to Hooker Electrochemical Company, Niagara Falls, N. Y., a corporation of New York No Drawing. Application June 26, 1947,
Serial No. 757,321

3 Claims. (Cl. 260—648)

The present invention is concerned with a process for the condensation of hexachlorocyclopentadiene with an unsaturated cyclic dieneophilic compound having five carbon atoms in the ring, in the presence of aluminum chloride.

The products of the aforesaid process are valuable as chemical intermediates for organic synthesis, for solvent uses and for the preparation of toxic substances such as insecticides, fungicides, etc.

The process may best be practiced by mixing about equimolar quantities of hexachlorocylopentadiene and a five-carbon atom unsaturated cyclic dieneophilic compound; with or without a solvent reaction medium such as hexachlorobutadiene, carbon disulphide, petroleum ether, perchloroethylene, carbon tetrachloride, et cetera; adding between about 0.01 to about 1.0 mole of aluminum chloride per mole of hexachlorocyclopentadiene and heating the reaction mixture to a temperature in the range between about 40 degrees centigrade and the refluxing temperature thereof. Preferably, the reaction is conducted at a temperature between about 65 degrees and 235 degrees centigrade, under the vapor pressure of the mixture at the temperature employed. The proportion of the organic reactants being condensed may be varied by using as much as one and one-half times the molar equivalent of a five-carbon atom unsaturated cyclic dieneophilic compound to about one-half mole thereof, per mole of hexachlorocyclopentadiene. The reaction time is affected by the thorough stirring of the reaction mixture and the temperature at which it is conducted, but requires only a few hours to go to completion after the mixture has attained a temperature above about 65 degrees centigrade.

Among the five carbon atom unsaturated cyclic dieneophilic compounds which may be condensed with hexachlorocyclopentadiene according to the present invention are hexachlorocyclopentadiene, cyclopentadiene, octachlorocyclopentene, cyclopentene, et cetera.

The following examples illustrate the practice of my invention, but are not to be construed as limiting the same:

Example I

One mole of hexachlorocyclopentadiene, dissolved in 7.0 moles of hexachlorobutadiene, and two-tenths mole of substantially anhydrous aluminum chloride is charged into a reactor provided with an agitator. The charge in the reactor is agitated, heated to a temperature of about 110 degrees centigrade and is maintained at that temperature for a period of five hours.

The product recovered is water-washed at room temperature to effect a removal of aluminum chloride, separated, and the bottom organic layer dried with anhydrous sodium sulfate. The dried product is fractionated under reduced pressure in an efficient column to remove hexachlorobutadiene and unreacted hexachlorocyclopentadiene. The residue is then cooled and a 45 per cent yield of $C_{10}Cl_{12}$ recovered, based on the hexachlorocyclopentadiene charged to the process.

After purification by recrystallization from benzene, the snow-white crystals of $C_{10}Cl_{12}$ product sublimes above 240 degrees centigrade and analyses 77.8 per cent chlorine (Theory 77.98 per cent chlorine).

Example II

One mole of hexachlorocyclopentadiene, dissolved in one mole of perchloroethylene, and three-tenths mole of substantially anhydrous aluminum chloride is charged into a reactor provided with an agitator. The charge in the reactor is agitated, and heated to a temperature between 80 and 85 degrees centigrade. The reaction mixture is maintained at that temperature for a period of nine hours. The product recovered is washed by decantation, forming a semi-solid material, which is steam distilled. About 90 per cent of the solvent is recovered by steam distillation, showing no appreciable reaction of the perchloroethylene. The remaining tan colored residue is filtered and recrystallized from benzene to give 168 parts of a white solid, which sublimes above 240 degrees centigrade without melting. This represents a yield of 62 per cent $C_{10}Cl_{12}$ of theory, based on the cyclic reactant charged. Analysis indicates a chlorine content of 77.9 per cent.

Example III

Three hundred and ninety-seven parts by weight of hexachlorocyclopentadiene and forty parts of anhydrous aluminum chloride is charged into a reactor provided with an agitator. The charge in the reactor is agitated, and heated to a temperature between 90 and 95 degrees centigrade for a period of one hour. At this stage of the reaction, the reaction mixture becomes extremely viscous. In order to reduce the viscosity, 457 parts by weight of carbon tetrachloride is introduced. The reaction is continued for an additional period of five hours at a temperature between 75 and 80 degrees centigrade. The reaction product is poured onto cracked ice, washed by decantation and steam distilled, whereupon substantially all of the carbon tetrachloride is removed. The resulting tan colored solid is purified by recrystallization from benzene, to yield 268 parts by weight of a white solid which sublimes at a temperature above 240 degrees centigrade, and shows a chlorine content of 77.9 per cent. This represents a conversion of 68 per cent to $C_{10}Cl_{12}$ of theory, based on the amount of hexachlorocyclopentadiene charged.

Example IV

In the same manner, but at a temperature of about 40 degrees centigrade, one gram-mole of cyclopentene is condensed with one gram mole of hexachlorocyclopentadiene, in the presence of 0.1 mole of aluminum chloride. By treatment of the reaction product as outline in Example I, $C_{10}H_8Cl_6$, a white crystalline product softening above 240 degrees centigrade is obtained in yield above 20 per cent, based on the hexachlorocyclopentadiene charged to the process. This product may readily be chlorinated, without destruction of its carbon skeleton, to yield valuable toxic products.

I claim:

1. The art of reacting hexachlorocyclopentadiene with itself in the presence of between about 0.01 and about 1.0 mole of aluminum chloride per mole of hexachlorocyclopentadiene and at a temperature between 40 degrees centigrade and the reflux temperature of the reaction mixture.

2. The process of claim 1 wherein the temperature employed is between about 65 degrees and 235 degrees centigrade and the pressure is the vapor pressure of the mixture at the temperature employed.

3. The process of claim 1 wherein an inert solvent for the organic reactant is employed.

References Cited in the file of this patent

UNITED STATES PATENTS

| | | |
|---|---|---|
| 2,519,190 | Hyman | Aug. 15, 1950 |
| 2,606,910 | Herzfeld et al. | Aug. 12, 1952 |

FOREIGN PATENTS

| | | |
|---|---|---|
| 463,631 | Belgium | Apr. 1946 |
| 464,617 | Belgium | May 1946 |

OTHER REFERENCES

Norton, "Chemical Reviews," vol. 31, page 357 (1942).

Prins, "Rec. des. trav. Chim. des Pays-Bas," vol. 65, pages 455–67 (1946).

Prill, "Jour. Am. Chem. Soc.," vol. 69, pages 62–3 (1947).